US007661849B2

(12) United States Patent  (10) Patent No.: US 7,661,849 B2
Lo et al.  (45) Date of Patent: Feb. 16, 2010

(54) ILLUMINATED APPARATUS

(75) Inventors: Ping Sun Patrick Lo, Tower 3C, 33/F, Parc Palais, 18 Wylie Road, King's Park, Kowloon, Hong Kong (CN); Hok-Yuk Patrick Cheung, Flat 1, Floor 6, Block A, Grandview Tower, 120 100 Kennedy Road, Wan Shai, Hong Kong (CN)

(73) Assignees: Ping Sun Patrick Lo, Hong Kong (CN); Hok-Yuk Patrick Cheung, Hong Kong (CN)

( * ) Notice: Subject to any disclaimer, the term of this patent is extended or adjusted under 35 U.S.C. 154(b) by 218 days.

(21) Appl. No.: 11/929,113

(22) Filed: Oct. 30, 2007

(65) Prior Publication Data

US 2008/0123346 A1    May 29, 2008

Related U.S. Application Data

(60) Provisional application No. 60/861,374, filed on Nov. 27, 2006.

(51) Int. Cl.
F21V 5/00 (2006.01)
(52) U.S. Cl. .............................. 362/311.04; 362/311.05
(58) Field of Classification Search ................. 362/135, 362/136, 154, 155, 311.02, 311.04, 311.14, 362/311.15
See application file for complete search history.

(56) References Cited

U.S. PATENT DOCUMENTS

| 3,598,987 | A | 8/1971 | Kipping | |
| 4,673,254 | A * | 6/1987 | Kato et al. | 362/311.04 |
| 4,886,183 | A | 12/1989 | Fleming | |
| D437,590 | S | 2/2001 | Girt et al. | |
| 6,193,384 | B1 | 2/2001 | Stein | |
| 6,599,003 | B2 | 7/2003 | Hou et al. | |
| 6,604,836 | B2 | 8/2003 | Carlucci et al. | |
| 6,776,494 | B2 * | 8/2004 | Fujino et al. | 362/623 |
| 6,848,822 | B2 | 2/2005 | Ballen et al. | |
| 7,364,342 | B2 * | 4/2008 | Parker et al. | 362/626 |
| 7,527,416 | B2 * | 5/2009 | Lin | 362/626 |
| 2003/0072168 | A1 | 4/2003 | Hou et al. | |
| 2005/0122591 | A1 * | 6/2005 | Parker et al. | 359/619 |
| 2008/0130319 | A1 * | 6/2008 | Hsung et al. | 362/626 |

FOREIGN PATENT DOCUMENTS

| CN | 2179710 Y | 10/1994 |
| CN | 2478428 Y | 2/2002 |
| CN | 2653807 Y | 3/2004 |

* cited by examiner

Primary Examiner—David V Bruce
(74) Attorney, Agent, or Firm—Baker & McKenzie LLP

(57) ABSTRACT

An illuminating device features a light transmitting plate having a first surface and a second surface, the first surface having inward depressions.

18 Claims, 3 Drawing Sheets

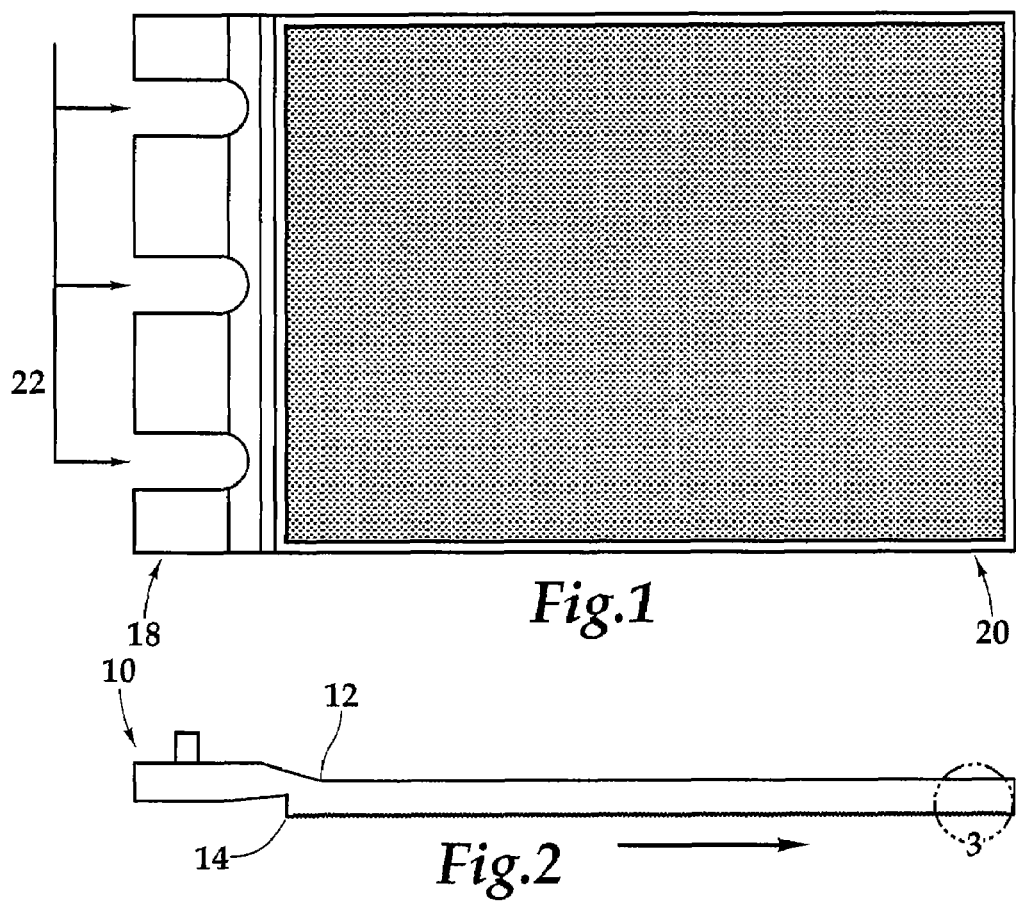
*Fig.1*
*Fig.2*
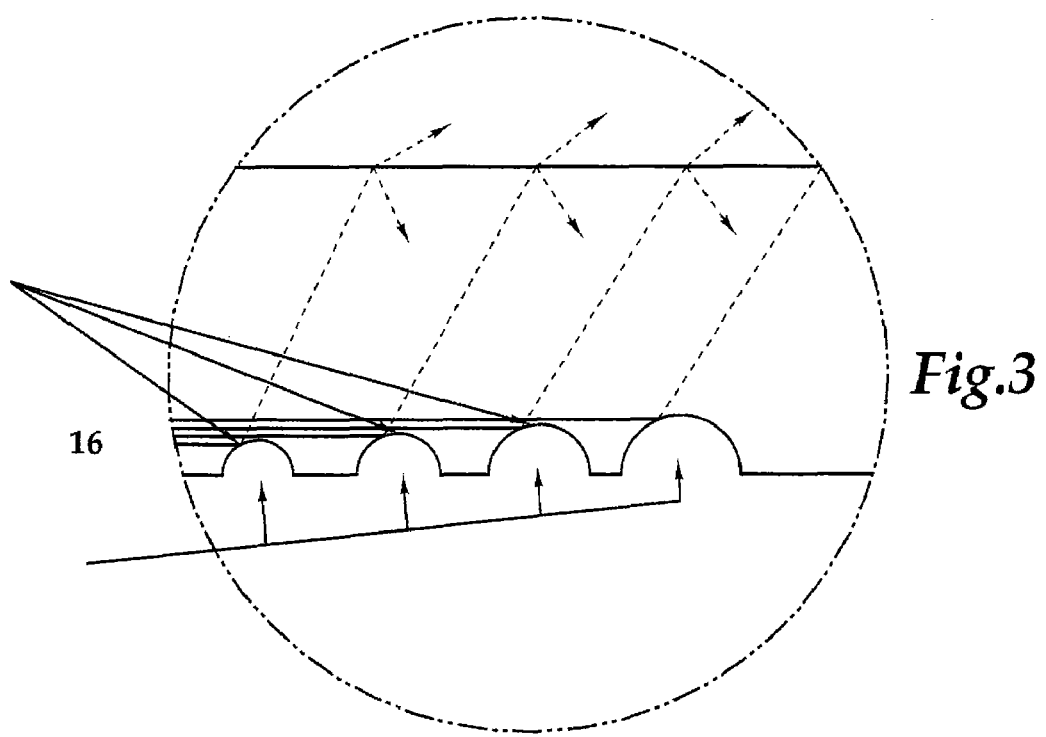
*Fig.3*

ILLUMINATED APPARATUS

CROSS REFERENCE TO RELATED APPLICATIONS

This application claims priority from U.S. provisional application No. 60/861,374 filed on Nov. 27, 2006, the entire content of which is incorporated by reference.

FEDERALLY SPONSORED RESEARCH

Not applicable.

REFERENCE TO MICROFICHE APPENDIX

Not applicable.

FIELD OF THE INVENTION

An illuminated apparatus, preferably an illuminated apparatus which utilizes a surface with depressions facilitating reflection and diffusion of lights transmitted therein.

BACKGROUND OF THE INVENTION

Electrically illuminated apparatus of diverse construction have been proposed for use as advertising and promotional campaigns, including badges, and attention grabbing novelties adapted. A common promotion is to give away an item that may have the company logo or design imprinted. Promotional items may be too small providing limited usage or too large making them bulky or difficult to carry around. It would be preferable to provide an item that is compact but also has multiple functions. The item would also provide a reminder of the company or promotion.

To attract the attention of consumers, lighting effects may be used to highlight the company logo and/or message. The lighting effects of the prior art technology may be glaring to the eyes or may not provide enough light to attract the attention of the consumer.

SUMMARY OF THE INVENTION

This invention is directed to a light transmitting plate with a carefully-designed surface structure. The surface comprises inward depressions which serves a special optical effect. In preferred embodiments, the size of the depressions vary in certain manners for better optical effects. In some further embodiments, the size of and the distance between the depressions vary in certain manners for better optical effects.

This invention is also directed to an illuminated apparatus utilizing such a light transmitting plate. With the optical effect brought by the plate, such an illuminated apparatus appears more attractive and can serve numerous purposes. For example, it can be used as a make-up box, a gift box, a jewelry box that carries logos for promotional purposes.

BRIEF DESCRIPTION OF THE DRAWINGS

FIG. 1 is a top view of an embodiment of a light transmitting plate of the invention.

FIG. 2 is a side view of an embodiment of the light transmitting plate of FIG. 1.

FIG. 3 is an enlarged view of the portion of the light transmitting plate shown in FIG. 2.

DESCRIPTION OF EMBODIMENTS OF THE INVENTION

Figure 4:
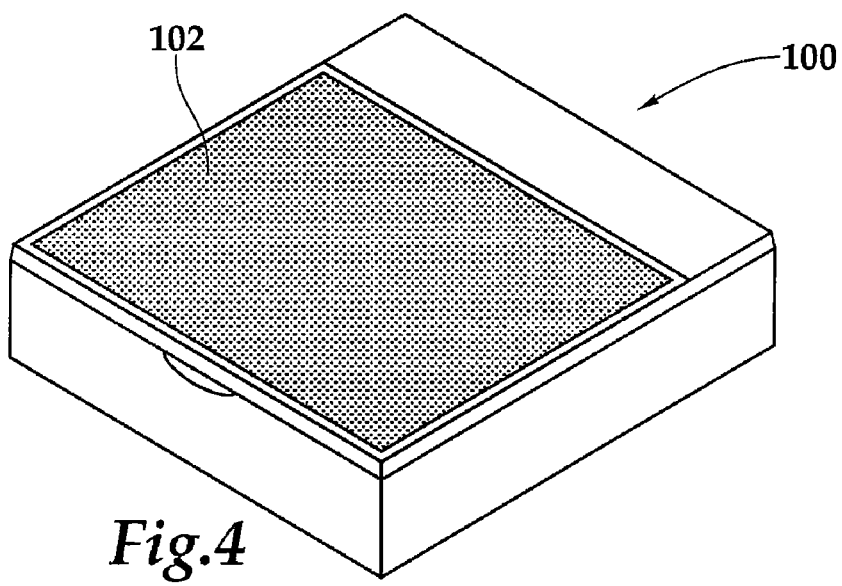
FIG. 4 is an embodiment of the light transmitting plate for use in a box in the closed position.

To one person of ordinary skill in this art who has the benefit of this invention's realizations, teachings, disclosures, and suggestions, other purposes and advantages will be appreciated from the following description and the accompanying drawings. The following description illustrates certain preferred embodiments and is not to be used to improperly limit the scope of the invention, which may have other equally effective or legally equivalent embodiments.

Referring to FIGS. 1, 2 and 3, a preferred embodiment of a light transmitting plate 10 is shown. In a preferred embodiment, the plate 10 is made of polymethyl-methacrylate. In alternate embodiments, the plate 10 is made of acrylonitrile-butadiene-styrene, plastic or glass. In certain embodiments, any material that is made from polystyrene can be applicable.

In certain embodiments, the plate 10 is produced with an injection molding method. Polystyrene beads are first put into an injection molding machine. The beads melt while going through the machine. The melting polystyrene liquid then goes through a 2-faced mold pre-designed with the depressions & formed into the plate 10. In further alternative embodiments, the plate is mainly made of a first transparent or translucent material one side or both sides of which are coated with polymethyl-methacrylate or acrylonitrile-butadiene-styrene.

The light transmitting plate 10 includes a top side/surface 12 and a bottom side/surface 14. The top side 12 preferably includes a plurality of inward depressions 16. The depressions can be semi-spherical, cone-shaped or in other geometric shape such as hexagon, diamond etc. Semi-spherical depressions are preferred in many applications as they provide a better optical effect. In some embodiments, the depressions are uniformly distributed and in other embodiments they are irregularly and randomly distributed. In some embodiments the depressions have the same size while in other embodiments the depressions are in different sizes. In an embodiment, for example, the plate has a first end 18 and a second end 20 and the depressions 16 increase in size from the first end 18 to the second end 20. In certain embodiments of this invention, the size of the depressions range from 0.1 mm to 1.0 mm. The depressions can be 0.05 mm spaced apart. In a preferred embodiment, a plurality of recesses 22 (four recesses for example) are at the first end 18 of the plate 10. In some embodiments, light sources are provided for within the recesses 22. In a preferred embodiment, the light source is a light emitting diode (LED). There are other alternative light sources, for example LED-Neon lights. Actually, one can decide to use a certain type of light source based on considerations of the costs/benefits.

Depressions in the plate 10 may be formed though ultrasonic welding or other applicable methods. Plastic injection molding methods are examples. Such methods are well known in the art.

Understandably from the basic theory of light reflection, as light emitted from the light sources travels through the plate 10, the inward surface of the depressions 16 cause reflection and diffusion of the light within the plate 10, as illustrated by FIG. 3. Such reflection and diffusion will be stronger when the size of depressions increases from the end close to the light source to the end remote from the light source, since there is more initial reflection of the light directly from the light source. With the reflection and diffusion of light within the plate 10, the light will not cause a glare to the eyes as it transmits though the plate 10 and the plate 10 presents a more visually beautiful look. In some embodiments, a portion of the light also passes through one or both sides of the light transmitting plate 10.

The size of the depressions may vary systematically or irregularly. Depressions of certain sizes in a given distribution form a pattern. Depending on the specific requirement, depressions in any given pattern can be formed. In some embodiments, depressions are distributed in lines and columns in the horizontal and vertical axis, respectively. The size of the depressions increases along the horizontal axis, which means that depressions in a column have the same size but depressions have an increasing size in a row. In other embodiments, the size of the depressions increases along both the horizontal and vertical axis, which means the very depression at one corner of the plate has the smallest size and the very depression at the diagonally opposite corner has the biggest size. In some further embodiments, the size of the depressions may vary in a more complex manner. For example, given one point at one end of the plate 10 as a center point, the size of the depressions may increase in radially. A light source may be provided at a recess located at the center point in this embodiment.

In further embodiments, both the top side 12 and bottom side 14 of the plate 10 are provided with depressions 16. The depressions in these embodiments may be formed in any given pattern. The depressions may have uniform size or have size increasing from one end to the other end of the plate 10.

While in some embodiments, light sources are provided within the recesses located at a end of the plate 10, in other embodiments, light sources may be located somewhere else, for example, in the middle of the plate 10, depending on particular requirements. When a light source is located in the middle of the plate 10, the size of depressions of the plate 10 may increase radially with the light source as the center point.

While the embodiment shown is rectangular in shape, any shape may be used. The shape of the light transmitting plate 10 is dependent on the function of the article the plate will be used in. Furthermore, the size of the light transmitting plate 10 is dependent on the function of the article the plate will be used in. Preferably, the light transmitting plate 10 is handheld.

Figure 5:
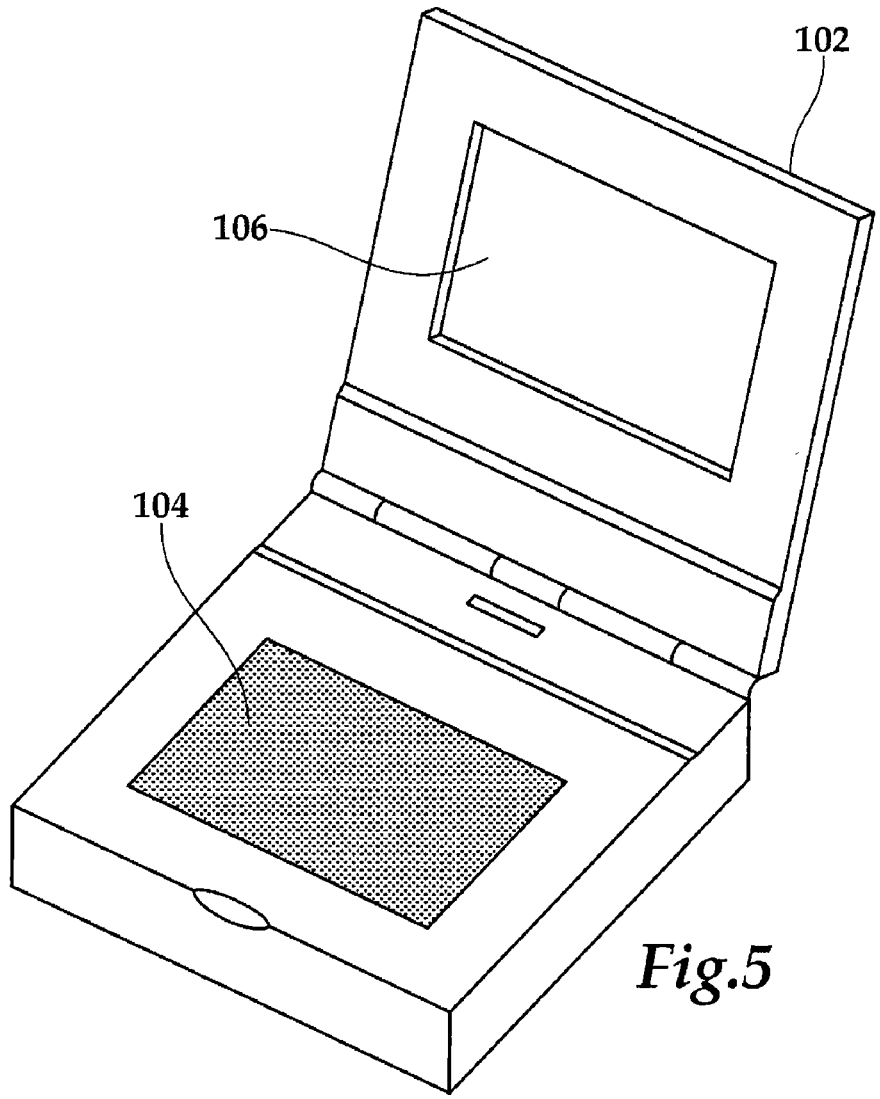
FIG. 5 is the embodiment of FIG. 4 in the open position.
Figure 6:
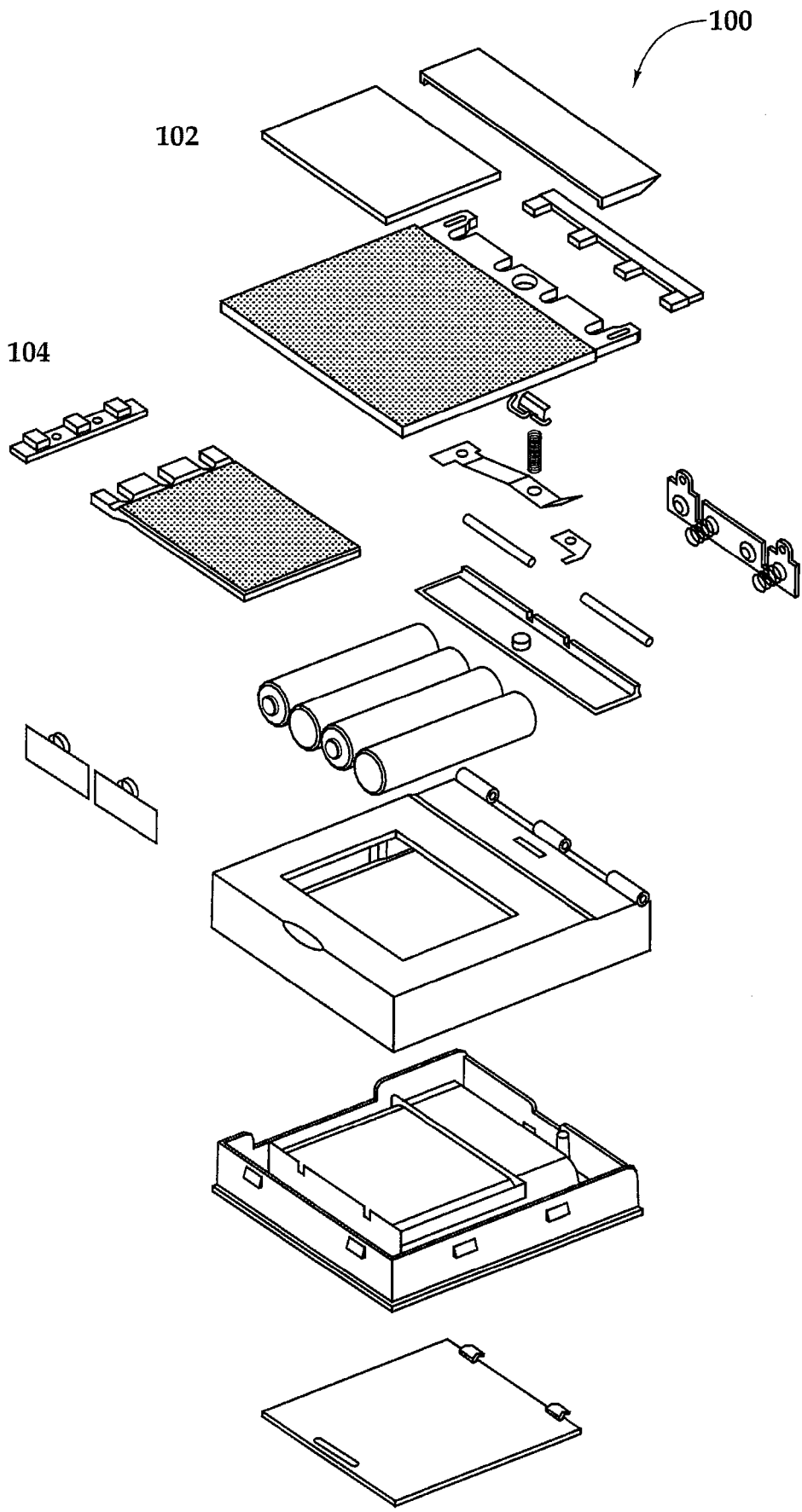
FIG. 6 is an exploded view of the box of FIG. 4.

Referring to FIGS. 4 and 5, an embodiment, an illuminated box 100, including one or more light transmitting plates 10 as described above, is shown. A first light transmitting plate 102 may be used as a lid cover and a second light transmitting plate 104 may be used as a cover within the compartment of the box. The lid cover 102 is conned to the main body of the box 100 through a hinge or in other applicable manner. In some embodiments, only one of the lid covers and the cover within the compartment of the box is a light transmitting plate. Some embodiments of the illuminated box may include, but are not limited to, jewelry boxes, watch boxes, gift boxes, stationery boxes and the like.

The illuminated box 100 includes a power source to power up light sources in the first light transmitting plate 102 and the second light transmitting plate 104. While four light sources are used for the first plate 102 in this embodiment, other numbers of lights sources can be used in other embodiments. While the four light sources are located at one edge of the first lid cover in the illustrated embodiment, they can be positioned in other manners. For example, each of the four edges of the first lid cover may have a light source. In a given embodiments, three light sources are used for the second plate 104.

In some embodiments, the light sources are light emitting diodes. The light emitting diodes may be a plurality of colors. The color of the light emitting diodes may change according to a pre-programmed electronic chip (e.g. a Central Processing Unit (CPU)). In some embodiments, the change may be pre-set for certain time intervals.

As the power source, four 3-A batteries may be used. Other applicable power sources can also be used as a person of ordinary skill in the art deems appropriate.

In some embodiments, a reflective surface 106 is embedded onto the bottom side 14 of the first light transmitting plate 102. The reflective surface 106 may be a mirror. The reflective surface 106 preferably facilitates a user who may do some basic make up or tidying up in a dim environment.

In other embodiments, the light transmitting plate 10, may include advertising ornamentation, including but not limited to, beading, gemstones, promotional logos and or messages. This ornamentation may be placed on the top side by any such means, but not limited to those, known to one skilled in the art. As light passes through the light transmitting plate 10, the light will highlight the company logo and/or the decorative ornamentation on the surface.

In an alternate embodiment, the light transmitting plate 10 may be similar in size to a credit card. In other embodiments, the light transmitting plate 10 may be incorporated with interchangeable cartridges. These cartridges may include devices having audio/video functions, message sending/receiving functions, etc. In a preferred embodiment, the various functions will be provided by connecting the various cartridges to the light transmitting plate and/or a power source. The power source can be rechargeable batteries currently used in mobile phone, iPOD® and the like. The separating of the light transmitting plate 10 from the cartridges may operate on basic mechanical actions for example, but not limited to, flipping, sliding, clipping, etc. The light transmitting plate 10 preferably includes a power source and light sources to transmit light through the light transmitting plate 10.

The illuminated box 100 may include an ON/OFF switch made of acrylonitrile butadiene styrene or other applicable materials. The switch can be closed (therefore connecting the light sources to the power source and turning them on) or disconnected (therefore disconnecting the light source from the power source and turning them off) automatically when the first lid cover is opened or closed. A spring made of stainless steel or other applicable materials can be installed in the box to facilitate the opening or closing of the first lid cover. In other embodiments, the switch is not automatic and should be operated on by the user manually to turn on or off. In some further embodiments, the illuminated box 100 comprises two ON/OFF switches, one for the light sources in the first lid cover and the other for the light sources in the second lid cover. Either of the switches can be automatic or should be operated on manually.

The light transmitting plate 10 may also be used in the following embodiments, but is not limited to, badges, signboards, makeup compact or any article that requires an illuminated surface and/or article.

Although in the foregoing embodiments, light transmitting plates with depressions on one or two of its sides are described, in certain other embodiments, light transmitting plates with outward protrusions are used. The shape, size and pattern of the protrusions can be similar to the depressions described above.

In conclusion, therefore, it is seen that the present invention and the embodiments disclosed herein are well adapted to carry out the objectives and obtain the ends set forth. Certain changes can be made in the subject matter without departing from the spirit and the scope of this invention. It is realized that changes are possible within the scope of this invention, and it is further intended that each element or step recited is to be understood as referring to all equivalent elements or steps. The description is intended to cover the invention as broadly as legally possible in whatever forms it may be utilized.

We claim:

1. An illuminated apparatus comprising,
a first light transmitting plate as a cover;
an illuminating device coupled to the first light transmitting plate at one end,
wherein the first light transmitting plate has a surface with inward depressions,
wherein the first light transmitting plate and the illuminating device coupled to the first light transmitting plate are included in an interchangeable cartridge.

2. The illuminated apparatus of claim 1, wherein the depressions have varying size.

3. The illuminated apparatus of claim 1, wherein the first light transmitting plate has a first end and a second end and the size of the depressions ascend away from the first end to the second end.

4. The illuminated apparatus of claim 2, wherein the illuminating device is a surface mounted light emitting diode (LED).

5. The illuminated apparatus of claim 2, further comprising additional illuminating devices coupled to the first light transmitting plate.

6. The illuminated apparatus of claim 3, further comprising a reflective surface.

7. The illuminated apparatus of claim 1, further comprising a second light transmitting plate.

8. The illuminated apparatus of claim 7, further comprising at least one illuminating device coupled to the second light transmitting plate.

9. The illuminated apparatus of claim 1, wherein the color of the light emitted from the illuminating device can be changed.

10. The illuminated apparatus of claim 9, further comprising an electronic chip which controls the change of the color of the light emitted from the illuminating device or the interval of the color change.

11. The illuminated apparatus of claim 1, wherein the cartridge comprises audio and video functions.

12. The illuminated apparatus of claim 1, wherein the illuminated apparatus is a make-up box with the first light transmitting plate being its cover.

13. The illuminated apparatus of claim 12, further comprising a second light transmitting plate as a cover within its compartment, wherein the second light transmitting plate has a surface with depressions.

14. The illuminated apparatus of claim 13, wherein the second light transmitting plate has at least one illuminating device coupled thereto.

15. The illuminated apparatus of claim 1, further comprising a power source powering up the illuminating device.

16. The illuminated apparatus of claim 15, wherein the power source includes a battery.

17. The illuminated apparatus of claim 1, wherein the size of the depressions increases from the end at which the illuminating device is coupled to the first light transmitting plate.

18. The illuminated apparatus of claim 1, wherein the size of the depressions increases radially with the illuminating device as a center point.

* * * * *